(12) United States Patent
Klobucar

(10) Patent No.: US 7,370,417 B2
(45) Date of Patent: May 13, 2008

(54) METHOD OF INSTALLING A MOLD GATE INSERT IN AN INJECTION MOLDING APPARATUS

(75) Inventor: Peter Klobucar, Georgetown (CA)

(73) Assignee: Mold-Masters (2007) Limited, Georgetown, Ontario (CA)

(*) Notice: Subject to any disclaimer, the term of this patent is extended or adjusted under 35 U.S.C. 154(b) by 171 days.

(21) Appl. No.: 11/298,059

(22) Filed: Dec. 9, 2005

(65) Prior Publication Data

US 2007/0132145 A1    Jun. 14, 2007

(51) Int. Cl.
*B21D 53/00* (2006.01)
*B29C 45/20* (2006.01)

(52) U.S. Cl. .............. 29/890.142; 29/525.01; 29/525.11; 425/549; 264/328.15

(58) Field of Classification Search ........... 29/890.142, 29/469, 525.01, 525.11, 525.12; 264/328.15; 425/549

See application file for complete search history.

(56) References Cited

U.S. PATENT DOCUMENTS

| | | |
|---|---|---|
| 4,389,002 A | 6/1983 | Devellian et al. |
| 4,702,689 A | 10/1987 | Schmidt et al. |
| 4,771,164 A | 9/1988 | Gellert |
| 4,793,795 A | 12/1988 | Schmidt et al. |
| 4,810,184 A | 3/1989 | Gellert et al. |
| 4,837,925 A | 6/1989 | Gellert |
| 4,875,848 A | 10/1989 | Gellert |
| 5,000,675 A | 3/1991 | Gellert et al. |
| 5,028,227 A | 7/1991 | Gellert et al. |
| 5,106,291 A | 4/1992 | Gellert |
| 5,299,928 A | 4/1994 | Gellert |
| 5,421,716 A | 6/1995 | Gellert |
| 5,554,395 A | 9/1996 | Hume et al. |
| 5,589,206 A | 12/1996 | Hepler |
| 5,795,599 A | 8/1998 | Gellert |
| 5,871,785 A | 2/1999 | Van Boekel |

(Continued)

FOREIGN PATENT DOCUMENTS

CA    2539597    3/2005

(Continued)

OTHER PUBLICATIONS

"Dynisco Hot Runners—GB -series", date unknown.

*Primary Examiner*—Jermie E. Cozart
(74) *Attorney, Agent, or Firm*—Medler Ferro PLLC

(57) ABSTRACT

An injection molding apparatus including an injection manifold having a manifold melt channel, a mold plate having a mold bore, and a hot runner nozzle located in the mold bore and having a nozzle melt channel. A mold insert including a melt channel includes an upper end adjacent the nozzle, a first outer surface adjacent the upper end, and a lower portion including a second outer surface, wherein the second outer surface is in sealing contact with an inner surface of the mold plate. A mold gate insert retainer includes an inner surface surrounding the first outer surface of the mold gate insert and a threaded outer surface for mating with a threaded inner surface of the nozzle. The first outer surface of the mold gate insert and the inner surface of the mold gate insert retainer are non-threaded. A lower end surface of the mold gate insert may form a wall of the mold cavity and may be angled.

10 Claims, 3 Drawing Sheets

U.S. PATENT DOCUMENTS

| | | |
|---|---|---|
| 5,879,727 A | 3/1999 | Puri |
| 5,916,605 A | 6/1999 | Swenson et al. |
| 6,095,790 A | 8/2000 | Gellert et al. |
| 6,398,541 B1 | 6/2002 | Seres, Jr. et al. |
| 6,478,567 B1 | 11/2002 | Kushnir et al. |
| 6,530,770 B2 | 3/2003 | Sheffield et al. |
| 6,712,597 B1 | 3/2004 | Van Boekel |
| 6,743,009 B1 | 6/2004 | Ramond |
| 6,832,909 B2 | 12/2004 | Bazzo et al. |
| 6,971,869 B2 | 12/2005 | Olaru |
| 2006/0024402 A1 | 11/2002 | Goinski |
| 2005/0095313 A1 | 5/2005 | Ciccone |
| 2005/0191383 A1 | 9/2005 | Goinski |
| 2005/0248056 A1 | 11/2005 | Canavese et al. |

FOREIGN PATENT DOCUMENTS

| | | |
|---|---|---|
| DE | 28 35 805 A1 | 2/1980 |
| EP | 1 295 693 A1 | 3/2003 |
| FR | 2829058 | 2/2003 |
| GB | 1075882 | 7/1967 |

METHOD OF INSTALLING A MOLD GATE INSERT IN AN INJECTION MOLDING APPARATUS

BACKGROUND OF THE INVENTION

1. Field of the Invention

The invention relates to injection molding, and particularly to a mold gate insert and mold gate insert retainer in an injection molding apparatus.

2. Background of the Invention

Injection molding is a common manufacturing practice. Various articles of commercial value such as plastic bottles, toothbrushes, and children's toys, are made using well-known injection molding techniques. Injection molding generally involves melting a material, which is often plastic, then forcing the melt stream at high temperatures and pressures through one or more gates into a mold cavity. The melt cools in the shape of the mold cavity, which is opened to eject the finished part.

The melt is supplied from a machine nozzle, injected into a heated manifold and distributed to the mold cavities through heated nozzles. The heated nozzles are seated within bores in a mold plate that forms the mold cavities. The mold plate is cooled so that melt injected into the cavities can be adequately cooled prior to ejection. However, because the nozzle is heated and the mold plate is cooled, heat from the nozzle is drawn from the nozzle into the mold plate, which can create difficulty in maintaining the melt at an optimum temperature in the nozzle. As a result, it is often desirable to configure the injection molding system to reduce heat transfer from the nozzles to the mold plate, especially proximal to the mold gates, while still maintaining an adequate seal between each nozzle and a respective mold gate.

Front-gated nozzles often include a two piece nozzle seal, including an inner piece and an outer piece, to maintain the position of the nozzle in the mold plate and to provide a seal between the nozzle and the mold plate. In some systems, the nozzle seal suspends the nozzle body within a bore in the mold plate so that there is no direct contact between the nozzle body and mold plate. To further reduce heat transfer between the nozzle and the mold plate, the inner piece generally does not contact the mold plate, and the outer piece which contacts the mold plate, is constructed from materials that are less thermally conductive than the nozzle body or the mold plate. During mold cycles, the temperature of the injection molding system components fluctuate, resulting in thermal expansion and contraction of those components. During the temperature cycles, sealing between the nozzle and the mold gate can be maintained by sliding contact between the outer piece of the nozzle seal and the mold plate.

The conventional two piece nozzle seal is generally threadably secured to the nozzle. In some circumstances, one of the pieces (generally the outer piece) of the nozzle seal may form a portion of the surface of the mold cavity. In an application where the mold cavity surface is angled, the surface of the nozzle seal must be angled to correspond to the angled mold cavity surface. However, because the nozzle seal is generally threaded to the nozzle, the position of the thread starts and stops on both the nozzle and the seal, as well as the act of torqueing the seal, does not permit predictability and repetition of the final angular position of the seal. Thus, the seal's angular orientation cannot be repeated if the seal has to be removed for any reason.

Some conventional ways of avoiding this problem are either to avoid cutting the bottom of the seal or to mark the seal and the nozzle with a scribe line when they are together. When the components are re-installed, the toolmaker must torque the seal until the scribe lines are aligned.

There is therefore a need to provide a more convenient way to seal the gap between the nozzle and the mold gate and to permit easy removal and replacement of the components.

SUMMARY OF THE INVENTION

A hot runner system includes a manifold, a nozzle, a mold gate insert, and a mold gate insert retainer. The manifold defines a manifold melt channel and is configured to receive melt from a melt source. The nozzle includes a nozzle body and defines a nozzle melt channel. The nozzle is coupled to the manifold such that the nozzle melt channel is in fluid communication with the manifold melt channel. The mold gate insert is non-threadably coupled to the nozzle body by the mold gate insert retainer. The mold gate insert contacts the mold plate adjacent the mold gate and forms a surface of the mold cavity. The mold gate insert may or may not have an angled surface defining a portion of the mold cavity. An outside surface of the mold gate insert retainer includes threads that mate with threads on an inside surface of the nozzle. The mold gate insert retainer is seated against a shoulder of the mold gate insert to retain the mold gate insert against a shoulder of the nozzle.

If the bottom surface of the mold gate insert is angled, the mold gate insert can be maintained in its angled orientation while the mold gate insert retainer is screwed into the nozzle, thereby retaining the mold gate insert. Thus, the mold gate insert is not rotated and its orientation can be maintained.

The mold gate insert may be surrounded by a cooling gate insert that contacts the mold plate. The remaining portions of the device remain as described above.

Other aspects and features of the present invention will become apparent to those ordinarily skilled in the art upon review of the following figures and detailed description.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE DRAWINGS

Specific embodiments of the present invention are now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

Figure 1:
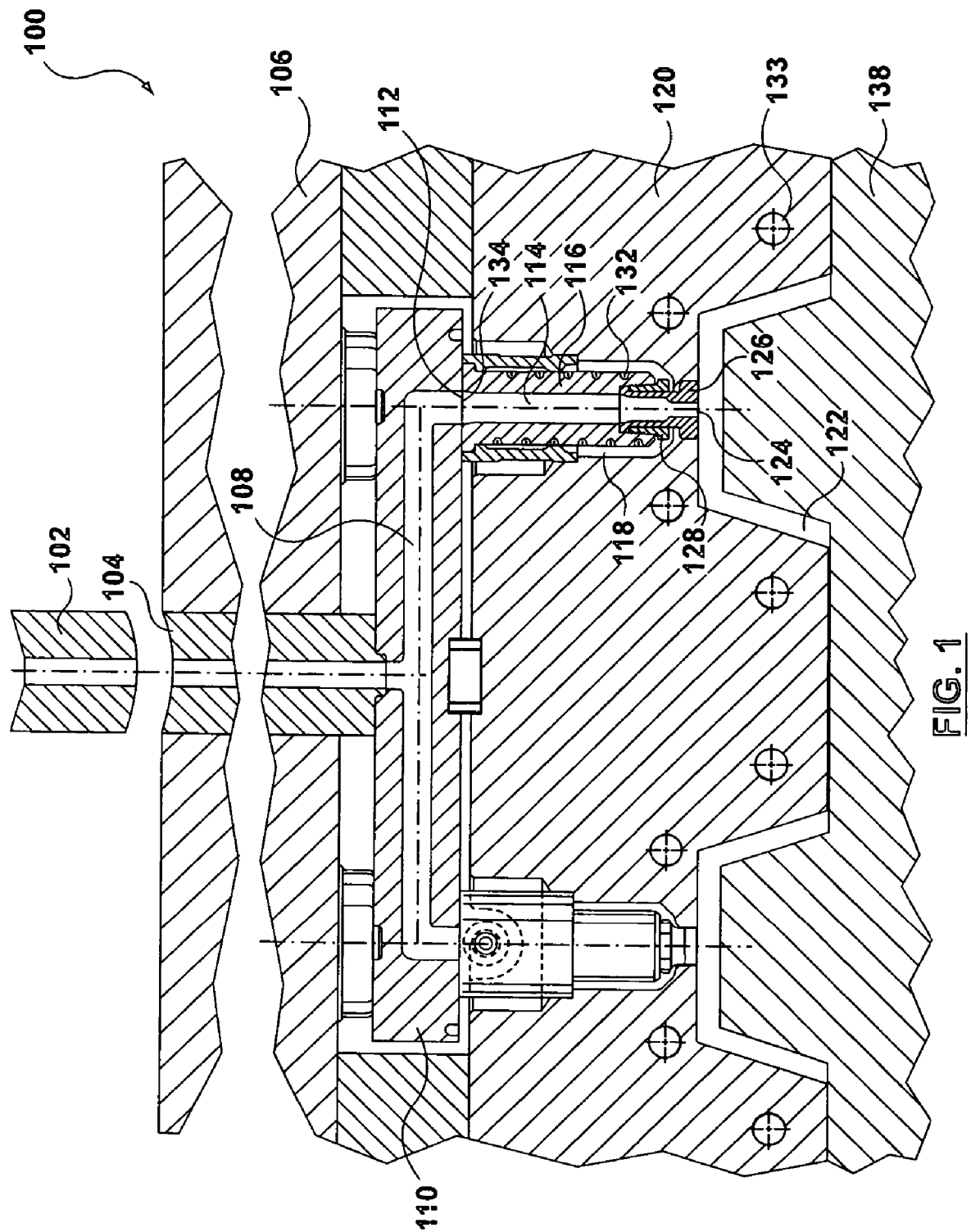
FIG. 1 is a cross-sectional view of an injection molding apparatus.

Referring first to FIG. 1, one example of an injection molding apparatus 100 with which the present invention may be utilized is shown. The injection molding apparatus includes a machine nozzle 102, which introduces a melt stream under pressure into the injection molding system via a sprue bushing 104 that is positioned within a machine platen 106. From sprue bushing 104, melt flows into a manifold melt channel 108 provided in a hot runner manifold 110. In injection molding apparatus 100, manifold 110 allows the melt stream to be distributed through manifold melt channel outlets 134 and into nozzle melt channels 114 provided in respective hot runner nozzles 116. Hot runner nozzles 116 are positioned within nozzle bores 118 of a mold plate 120 and each of hot runner nozzles 116 is aligned with a mold gate 124 by a mold gate insert 126 surrounded by a mold gate insert retainer 128. As would be apparent to one of ordinary skill in the art, mold plate 120 may include one or more mold plates, and/or a mold cavity plate. A mold core plate 138 mates with mold plate 120 to form mold cavities 122. Each hot runner nozzle 116 is in fluid communication with a respective mold cavity 122 via mold gate 124 so that the melt stream may be injected through nozzle melt channel 114 and the mold gate insert 126 and into mold cavities 122.

One of hot runner nozzles 116, included in FIG. 1, is shown in cross-section. Hot runner nozzle 116 has a nozzle melt channel inlet 112, at an upper end of nozzle melt channel 114, aligned with outlet 134 of manifold melt channel 108 to receive the melt stream and to deliver the melt through mold gate 124 to mold cavity 122. Injection molding apparatus 100 may include any number of such hot runner nozzles 116 located in respective nozzle bores 118 for transmitting melt from respective nozzle melt channel inlets 112 to respective mold gates 124. Injection molding apparatus 100 utilizes a heating element 132 in each nozzle and cooling channels 133 in the mold plate 120 to moderate the temperature of the melt. As shown, hot runner nozzle 116 is thermally gated. However it should be understood that hot runner nozzle 116 may alternatively be valve-gated.

Figure 2:
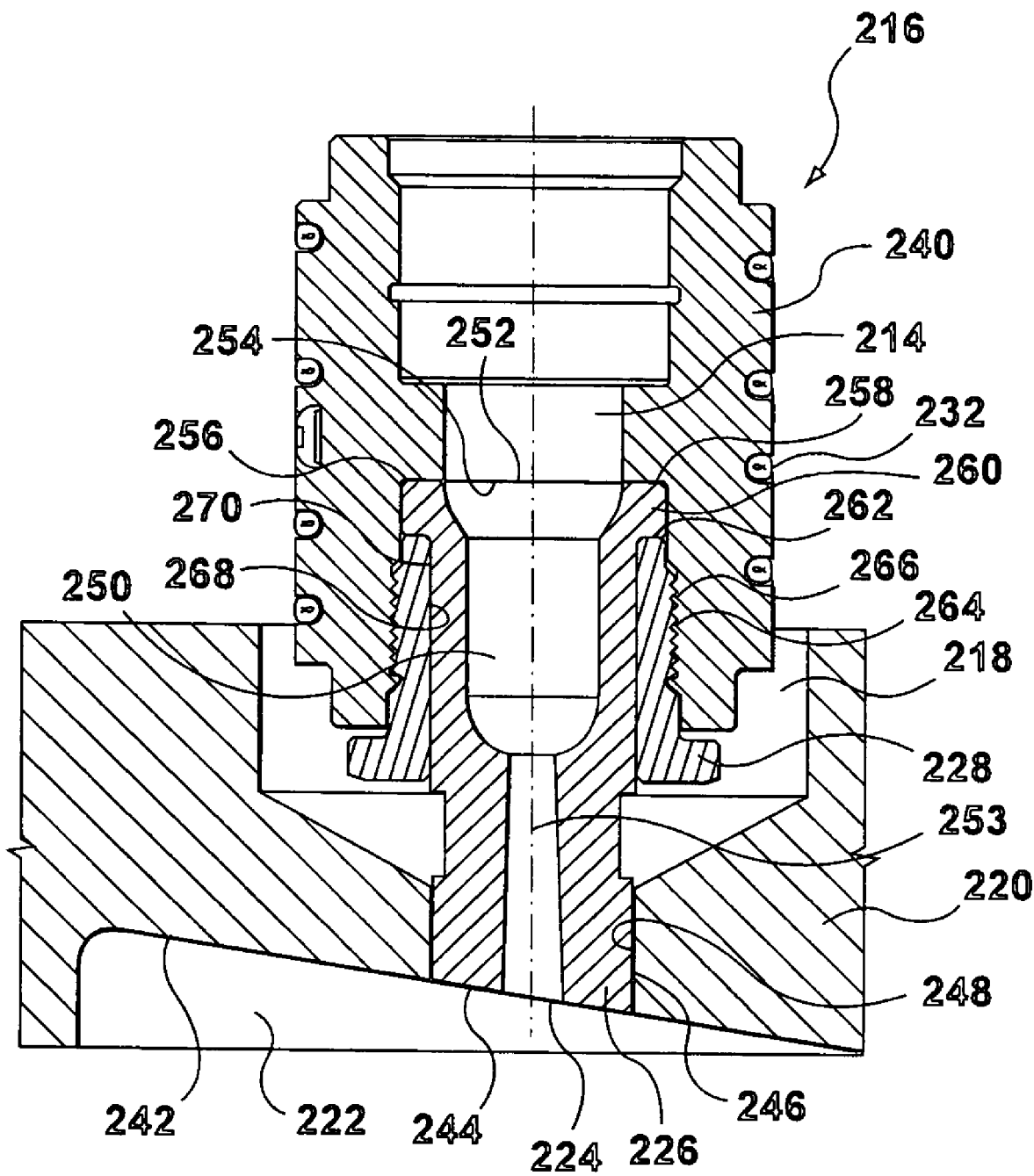
FIG. 2 is a cross-sectional view of an injection molding hot runner nozzle.

FIG. 2 shows a cross-section of a forward portion 240 of a nozzle 216. Nozzle 216 is much like nozzle 116 described with respect to FIG. 1, and would be used in an injection molding apparatus 100 as described with respect to FIG. 1. In the embodiment shown in FIG. 2, nozzle 216 includes a nozzle melt channel 214 that receives a melt stream from manifold melt channel 108 as described with respect to FIG. 1. Nozzle 216 is generally made from a thermally conductive material, such as a steel alloy, but can be made from other materials, as would be understand by those skilled in the art. A heating element 232 is disposed about nozzle 216. In the embodiment shown in FIG. 2, mold plate 220 includes an angled surface 242 such that a component made in mold cavity 222 will include an angled surface. Similarly, mold gate insert 226 includes an angled lower surface 244 that aligns with the angled surface 242 of mold plate 220. In the embodiment shown in FIG. 2, the angled lower surface 244 forms an angle other than 90 degrees with respect to central axis 253. Mold gate insert 226 also includes an outer surface 246 in scaling contact with an inner surface 248 of mold plate 220. Mold gate insert 226 can be made from materials considered conductive in the industry, such as copper alloys, molybdenum alloys, or steel (such as tool steel or stainless steel), or materials considered in the industry to be insulative, such as titanium or ceramic, depending on the application. Conductive materials can be used, for example, if it is desirable to keep the lower end of the mold gate insert 226 cool by contacting the cold mold plate 220. Insulative materials can be used, for example, if it is desirable to keep the lower end of the mold gate insert 226 warm, such that contact with the cold mold plate 220 does not cause the mold gate insert 226 to cool too rapidly. Depending on the application, one of ordinary skill in the art of injection molding would be able to select the appropriate material.

Mold gate insert 226 further includes a melt channel 250 having a central axis 253. Lower surface 244 of mold gate insert 226 may be disposed at any angle with respect to central axis 253. In this embodiment, lower surface 244 is at an angle other than 90 degrees so as to match the slope of the angled surface 242 of mold plate 220. Melt channel 250 transfers the melt stream from nozzle melt channel 214 to a mold gate 224. The molt gate insert melt channel 250 includes an inlet 252 at its upper end that aligns with an outlet 254 at the lower end of nozzle melt channel 214. An upper end 256 of mold gate insert 226 abuts against a shoulder 258 of nozzle 216. Mold gate insert 226 further includes a shoulder 260 against which a mold gate insert retainer 228 is seated to retain mold gate insert 226.

Mold gate insert retainer 228 includes an upper end 262 that abuts against shoulder 260 of mold gate insert 226. A portion of the outer surface of mold gate insert retainer 228 includes threads 264 that mate with threads 266 on an inner surface of nozzle 216. As shown in FIG. 2, at least a portion of an inner surface 268 of the mold gate insert retainer 228 surrounds a portion of an outer surface 270 of mold gate insert 226. Mold gate insert retainer 228 can made from materials considered conductive in the industry, such as copper alloys, molybdenum alloys, or steel (such as tool steel or stainless steel), or materials considered in the industry to be insulative, such as titanium or ceramic, depending on the application. Conductive materials can be used, for example, if it is desirable for heat from the hot runner nozzle 216 to be transferred from to the mold gate insert 226 via the mold gate insert retainer 228. Insulative materials can be used, for example, if it is desirable to minimize the transfer of heat from the hot runner nozzle 216 to the mold gate insert 226 via the mold gate insert retainer 228. Further, the mold gate insert retainer may be made of a material that is either less conductive, more conductive, or the same material as mold gate insert 226. Depending on the application, one of ordinary skill in the art of injection molding would be able to select the appropriate materials for the mold gate insert 226 and the mold gate insert retainer 228.

Due to the construction noted above, the orientation of the mold gate insert 226, in particular, the orientation of the angled lower surface 244, can be repeated because it is independent of the nozzle threads. Thus, the orientation of the mold gate insert is maintained during assembly or reassembly by holding onto its outer surface 246 using, for example, a spanner wrench. While preventing the mold gate insert 226 from turning, the mold gate insert retainer 228 is turned using, for example, another spanner wrench. The mold gate insert retainer 228 is turned until it retains the mold gate insert 226 against the nozzle 216 by abutting shoulder 260 of mold gate insert 226. Thus, the mold gate insert 226 is not rotated during assembly or reassembly. In this way, the orientation of the mold gate insert 226 can be repeated and any profiles formed on the lower surface 244 of the mold gate insert 226 can be aligned to match the profile of the surface 242 of mold plate 220, such that the desired shape of the molded part may be obtained.

Figure 3:
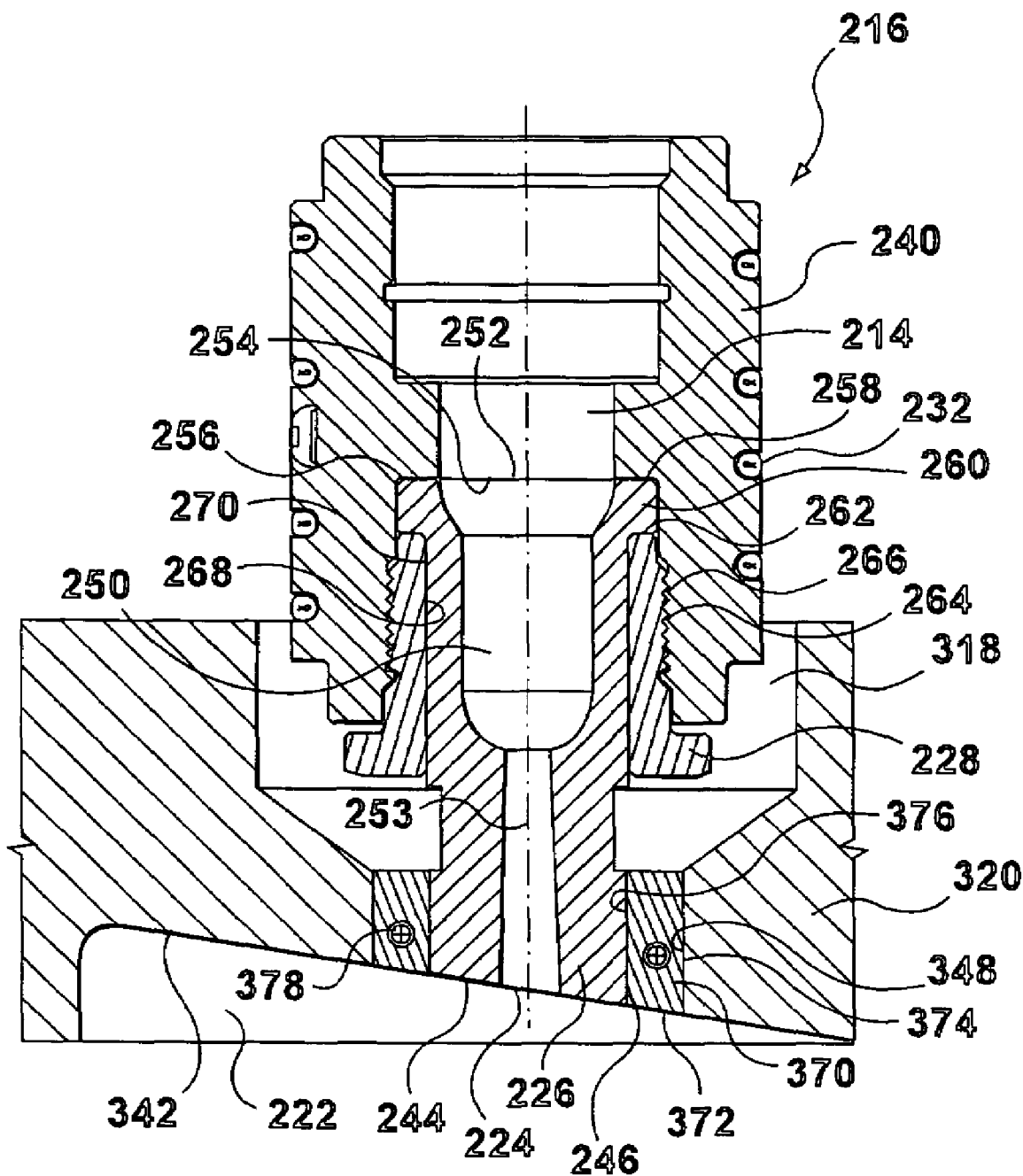
FIG. 3 is a cross-sectional view of an injection molding hot runner nozzle including a cooling gate insert.

FIG. 3 shows another embodiment of nozzle 216, wherein a cooling gate insert 370 surrounds a lower portion of the mold gate insert 226. The features of the nozzle 216, mold gate insert 226, and mold gate insert retainer 228 are the same as in FIG. 2, thus the same reference numerals are used for those elements of this embodiment. As can be seen in FIG. 3, cooling gate insert 370 is disposed between mold gate insert 226 and mold plate 320. Mold plate 320 includes a mold bore 318 similar to that described above with respect to FIGS. 1 and 2. Thus, an outer surface 374 of cooling gate insert 370 is in sealing contact with an inner surface 348 of mold plate 320. Similarly, outer surface 246 of a lower portion of mold gate insert 226 is in sealing contact with an inner surface 376 of cooling gate insert 370. In this particular embodiment, the mold cavity 222 is angled as in FIG. 2. Thus, cooling gate insert 370 includes an angled surface 372 that aligns with angled surface 342 of mold plate 320 and angled surface 244 of mold gate insert 226. In the embodiment shown in FIG. 3, the angled surface 372 forms an angle other than 90° with respect to the central axis 253. Cooling gate insert 370 includes one or more cooling channels 378 that assist in cooling around the mold gate 224. As with FIG. 2, the alignment of the mold gate insert 226 can be maintained during assembly and reassembly because the mold gate insert is not threadably engaged with the nozzle 216.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of installing a mold gate insert in an injection molding apparatus comprising the steps of:
   providing an injection manifold having a manifold melt channel;
   providing a mold plate having a mold bore;
   providing a hot runner nozzle located in the mold bore, said nozzle having a nozzle melt channel;
   providing a mold gate insert including a melt channel;
   holding the mold gate insert such that an upper end thereof contacts a shoulder of the nozzle;
   providing a mold gate insert retainer around a portion the mold gate insert;
   rotating the mold gate insert retainer relative to the mold gate insert such that the mold gate insert is not rotated relative to the nozzle and threads on an outer surface of the mold gate insert retainer engage with threads on an inner surface of the nozzle, wherein said mold gate insert retainer is rotated until an upper portion of the mold gate insert retainer abuts against a shoulder of the mold gate insert so as to retain the mold gate insert against the shoulder of the nozzle; and
   bringing the mold plate into sealing contact with an outer surface of a lower portion of the mold gate insert such that a lower surface of the mold gate insert forms a wall of a mold cavity, wherein the lower surface of the mold gate insert is disposed at an angle other than 90 degrees with respect to a central axis of the melt channel of the mold gate insert.

2. The method of claim 1, wherein said mold gate insert is made of a material selected from the group consisting of copper alloys, molybdenum alloys, copper alloys, and steel.

3. The method of claim 1, wherein said mold gate insert is made of a material selected from the group consisting of titanium and ceramic.

4. The method of claim 1, wherein said mold gate insert retainer is made of a material selected from the group consisting of copper alloys, molybdenum alloys, copper alloys, and steel.

5. The method of claim 1, wherein said mold gate insert retainer is made of a material selected from the group consisting of titanium and ceramic.

6. A method of installing a mold gate insert in an injection molding apparatus comprising the steps of:
   providing an injection manifold having a manifold melt channel;
   providing a mold plate having a mold bore;
   providing a hot runner nozzle located in the mold bore, said nozzle having a nozzle melt channel;
   providing a mold gate insert including a melt channel;
   holding the mold gate insert such that an upper end thereof contacts a shoulder of the nozzle;
   providing a mold gate insert retainer around a portion the mold gate insert;
   rotating the mold gate insert retainer relative to the mold gate insert such that the mold gate insert is not rotated relative to the nozzle and threads on an outer surface of the mold gate insert retainer engage with threads on an inner surface of the nozzle, wherein said mold gate insert retainer is rotated until an upper portion of the mold gate insert retainer abuts against a shoulder of the mold gate insert so as to retain the mold gate insert against the shoulder of the nozzle;
   providing a cooling gate insert surrounding an outer surface of a lower portion of the mold gate insert, wherein the cooling gate insert includes at least one cooling channel formed therein; and
   bringing the mold plate into sealing contact with an outer surface of the cooling gate insert such that a lower surface of the mold gate insert and a lower surface of the cooling gate insert form a wall of a mold cavity, wherein the lower surface of the mold gate insert is disposed at an angle other than 90 degrees with respect to a central axis of the melt channel of the mold gate insert.

7. The method of claim 6, wherein said mold gate insert is made of a material selected from the group consisting of copper alloys, molybdenum alloys, copper alloys, and steel.

8. The method of claim 6, wherein said mold gate insert is made of a material selected from the group consisting of titanium and ceramic.

9. The method of claim 6, wherein said mold gate insert retainer is made of a material selected from the group consisting of copper alloys, molybdenum alloys, copper alloys, and steel.

10. The method of claim 6, wherein said mold gate insert retainer is made of a material selected from the group consisting of titanium and ceramic.

* * * * *